United States Patent
Katoh

(10) Patent No.: US 11,168,786 B2
(45) Date of Patent: Nov. 9, 2021

(54) ELECTRIFIED VEHICLE AND CONTROL METHOD FOR ELECTRIFIED VEHICLE

(71) Applicant: Toyota Jidosha Kabushiki Kaisha, Toyota (JP)

(72) Inventor: Manabu Katoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/931,926

(22) Filed: Jul. 17, 2020

(65) Prior Publication Data
US 2021/0131557 A1    May 6, 2021

(30) Foreign Application Priority Data
Nov. 5, 2019    (JP) .............................. JP2019-200471

(51) Int. Cl.
| | |
|---|---|
| *B60W 10/08* | (2006.01) |
| *F16H 61/02* | (2006.01) |
| *F16H 59/50* | (2006.01) |
| *B60L 58/12* | (2019.01) |
| *B60L 53/22* | (2019.01) |
| *B60W 20/13* | (2016.01) |
| *B60W 10/10* | (2012.01) |
| *B60W 30/18* | (2012.01) |

(52) U.S. Cl.
CPC .......... *F16H 61/0204* (2013.01); *B60L 53/22* (2019.02); *B60L 58/12* (2019.02); *B60W 10/08* (2013.01); *B60W 20/13* (2016.01); *F16H 59/50* (2013.01); *B60W 10/10* (2013.01); *B60W 30/18027* (2013.01); *B60W 30/18045* (2013.01); *B60W 2510/1005* (2013.01); *B60W 2510/244* (2013.01); *B60W 2710/08* (2013.01); *F16H 2200/0021* (2013.01); *F16H 2306/20* (2013.01)

(58) Field of Classification Search
CPC .. F16H 61/0204; F16H 2306/20; B60L 58/12; B60W 10/08; B60W 10/10; B60W 20/13; B60W 30/18045; B60W 30/18027; B60W 2510/1005; B60W 2510/101; B60W 2510/244; B60W 2710/08
USPC ..................................................... 701/60, 66
See application file for complete search history.

(56) References Cited

FOREIGN PATENT DOCUMENTS

| JP | 2010125926 A | * | 6/2010 |
|---|---|---|---|
| JP | 2012081834 A | * | 4/2012 |

(Continued)

OTHER PUBLICATIONS

English translation of JP2017140998A; http://translationportal.epo.org; May 26, 2021 (Year: 2021).*

(Continued)

*Primary Examiner* — Roger L Pang
(74) *Attorney, Agent, or Firm* — Dinsmore & Shohl LLP

(57) ABSTRACT

An ECU executes processing including a step of counting up a duration Ntime when a Ready-On state is brought, and a shift position is an N position, a step of counting up a duration Not_Ntime when the duration Ntime is equal to or greater than a threshold value A, the duration Ntime is greater than a threshold value C, and the shift position is other than the N position, a step of resetting the duration Ntime and the duration Not_Ntime to initial values in a case where the duration Not_Ntime is greater than a threshold value D, and a step of executing warning processing when the duration Ntime is greater than the threshold value A.

6 Claims, 6 Drawing Sheets

(56) References Cited

FOREIGN PATENT DOCUMENTS

| | | | |
|---|---|---|---|
| JP | 2012218577 A | * | 11/2012 |
| JP | 5565256 B2 | | 8/2014 |
| JP | 2017140998 A | * | 8/2017 |

OTHER PUBLICATIONS

English translation of JP2012218577A; http://translationportal.epo.org; May 26, 2021 (Year: 2021).*
English translation of JP2010125926A; http://translationportal.epo.org; May 26, 2021 (Year: 2021).*

* cited by examiner

ELECTRIFIED VEHICLE AND CONTROL METHOD FOR ELECTRIFIED VEHICLE

CROSS-REFERENCE TO RELATED APPLICATIONS

This application claims priority to Japanese Patent Application No. 2019-200471 filed on Nov. 5, 2019, which is incorporated by reference herein in its entirety, including the specification, drawings and abstract.

BACKGROUND

1. Technical Field

The present disclosure relates to control of an electrified vehicle during selection of a neutral position.

2. Description of Related Art

Hitherto, an electrified vehicle in which an electric motor for drive and an electric power storage device configured to supply electric power to the electric motor for drive are mounted is known. In such an electrified vehicle, when a neutral position is selected as a shift position, generation of drive power is suppressed during the selection of the shift position, and the electric power storage device may be discharged due to power consumption in accessories or the like. As a result, the longer the selection time of the neutral position becomes, the remaining capacity of the electric power storage device is likely to decrease, and a travelable distance through electrified traveling is likely to be shortened.

In regard to such a problem, for example, Japanese Patent No. 5565256 (JP 5565256 B) discloses a technique that, in a hybrid vehicle, displays information for prompting change to a parking position when a state of charge of a secondary battery is less than a predetermined state of charge and a vehicle speed is equal to or lower than a predetermined vehicle speed when a neutral position is selected.

SUMMARY

Incidentally, as a condition for displaying information for prompting change to the parking position, for example, a condition that a time for which the neutral position is selected exceeds a predetermined time is considered. For example, a case where the time for which the neutral position is selected is measured, and when the measured time exceeds the predetermined time, information for prompting change to the parking position is displayed is considered. In this case, a case where a selection time measured when the shift position is switched to another shift position other than the neutral position is reset to an initial value (for example, zero) is considered.

However, when the neutral position is selected, and when another shift position (for example, a drive position, a parking position, or the like) other than the neutral position is temporarily selected and the user performs an operation to return to the neutral position again, the traveling distance through electrified traveling may not be restrained from being shortened. This is because, in a case where the above-described operation is repeated, the selection time of the neutral position is reset to the initial value every time, and as a result, the remaining capacity of the electric power storage device is continued to decrease while the user is not prompted to make change to another shift position.

The present disclosure provides an electrified vehicle and a control method for an electrified vehicle that enable notification of change of a shift position to a user at an appropriate timing according to a selection time of a neutral position.

A first aspect of the present disclosure relates to an electrified vehicle. The electrified vehicle includes an electric motor for drive, an electric power storage device, a notification device, an operating device, and a control device. The electric motor for drive is configured to generate drive power in a vehicle. The electric power storage device is configured to transmit and receive electric power to and from the electric motor for drive. The notification device is configured to give notification of predetermined information. The operating device is configured to issue a selection instruction to any one of a plurality of shift positions including a neutral position where the generation of the drive power is suppressed. The control device is configured to control the vehicle according to a shift position selected in response to the selection instruction. The control device is configured to give notification of information for prompting change of the shift position using the notification device when a value correlated to a decrease amount of a remaining capacity of the electric power storage device during the selection of the neutral position exceeds a value determined in advance. The control device is configured to, when the neutral position is selected again after the shift position is switched from the neutral position to another shift position, reset the value correlated to the decrease amount to an initial value in a case where an elapsed time during the selection of the other shift position exceeds a time determined in advance. The control device is configured to maintain the value correlated to the decrease amount before the shift position is switched to the other shift position without resetting the value in a case where the elapsed time does not exceed the time determined in advance.

With this configuration, when the other shift position is selected from the neutral position, and the neutral position is selected again when the elapsed time during the selection of the other shift position does not exceed the time determined in advance, the value correlated to the decrease amount is maintained without being reset. For this reason, since information for prompting change to the other shift position when the value correlated to the decrease amount exceeds the value determined in advance is notified, when the selection time of the neutral position is extended even though there is a period during which the other shift position is temporarily selected, it is possible to notify the user of change to the other shift position.

In an embodiment, the value correlated to the decrease amount includes a time for which the neutral position is selected.

With this configuration, when the other shift position is selected from the neutral position, and the neutral position is selected again when the elapsed time during the selection of the other shift position does not exceed the time determined in advance, the time for which the neutral position is selected is maintained without being reset. For this reason, since information for prompting change to the other shift position when the time for which the neutral position is selected exceeds the value determined in advance is notified, when the selection time of the neutral position is extended even though there is a period during which the other shift position is temporarily selected, it is possible to notify the user notified of change to the other shift position.

In an embodiment, the value correlated to the decrease amount includes a magnitude of the decrease amount.

With this configuration, when the other shift position is selected from the neutral position, and the neutral position is selected again when the elapsed time during the selection of the other shift position does not exceed the time determined in advance, the magnitude of the decrease amount is maintained without being reset. For this reason, since information for prompting change to the other shift position when the magnitude of the decrease amount exceeds the value determined in advance is notified, when the selection time of the neutral position is extended even though there is a period during which the other shift position is temporarily selected, it is possible to notify the user of change to the other shift position.

In an embodiment, the control device is configured to, when the neutral position is selected again from the other shift position, reset the elapsed time to an initial value in addition the value correlated to the decrease amount in a case where the elapsed time exceeds the time determined in advance.

With this configuration, since the elapsed time is reset to the initial value in addition to the value correlated to the decrease amount in a case where the elapsed time exceeds the time determined in advance, when the other shift position is temporarily selected thereafter, it is possible to restrain the value correlated to the decrease amount from being reset to the initial value.

In an embodiment, the control device is configured to suppress charging of the electric power storage device when the neutral position is selected.

With this configuration, when the selection time of the neutral position is extended, since the user is notified of change to the other shift position, it is possible to suppress a decrease in remaining capacity of the electric power storage device.

A second aspect of the present disclosure relates to a control method for an electrified vehicle. The electrified vehicle includes an electric motor for drive, an electric power storage device, a notification device, and an operating device. The electric motor for drive is configured to generate drive power in a vehicle. The electric power storage device is configured to transmit and receive electric power to and from the electric motor for drive. The notification device is configured to give notification of predetermined information. The operating device is configured to issue a selection instruction to any one of a plurality of shift positions including a neutral position where the generation of the drive power and charging of the electric power storage device is suppressed. The control method includes controlling the vehicle according to a shift position selected in response to the selection instruction, giving notification of information for prompting change of the shift position using the notification device when a value correlated to a decrease amount of a remaining capacity of the electric power storage device during the selection of the neutral position exceeds a value determined in advance, resetting a value correlated to the decrease amount to an initial value in a case where an elapsed time for which another shift position is selected exceeds a time determined in advance when the neutral position is selected again after the shift position is switched from the neutral position to the other shift position, and maintaining the value correlated to the decrease amount before the shift position is switched to the other shift position without resetting the value in a case where the elapsed time does not exceed the time determined in advance.

According to the present disclosure, it is possible to provide an electrified vehicle and a control method for an electrified vehicle that enable notification of change of a shift position to a user at an appropriate timing according to a selection time of a neutral position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
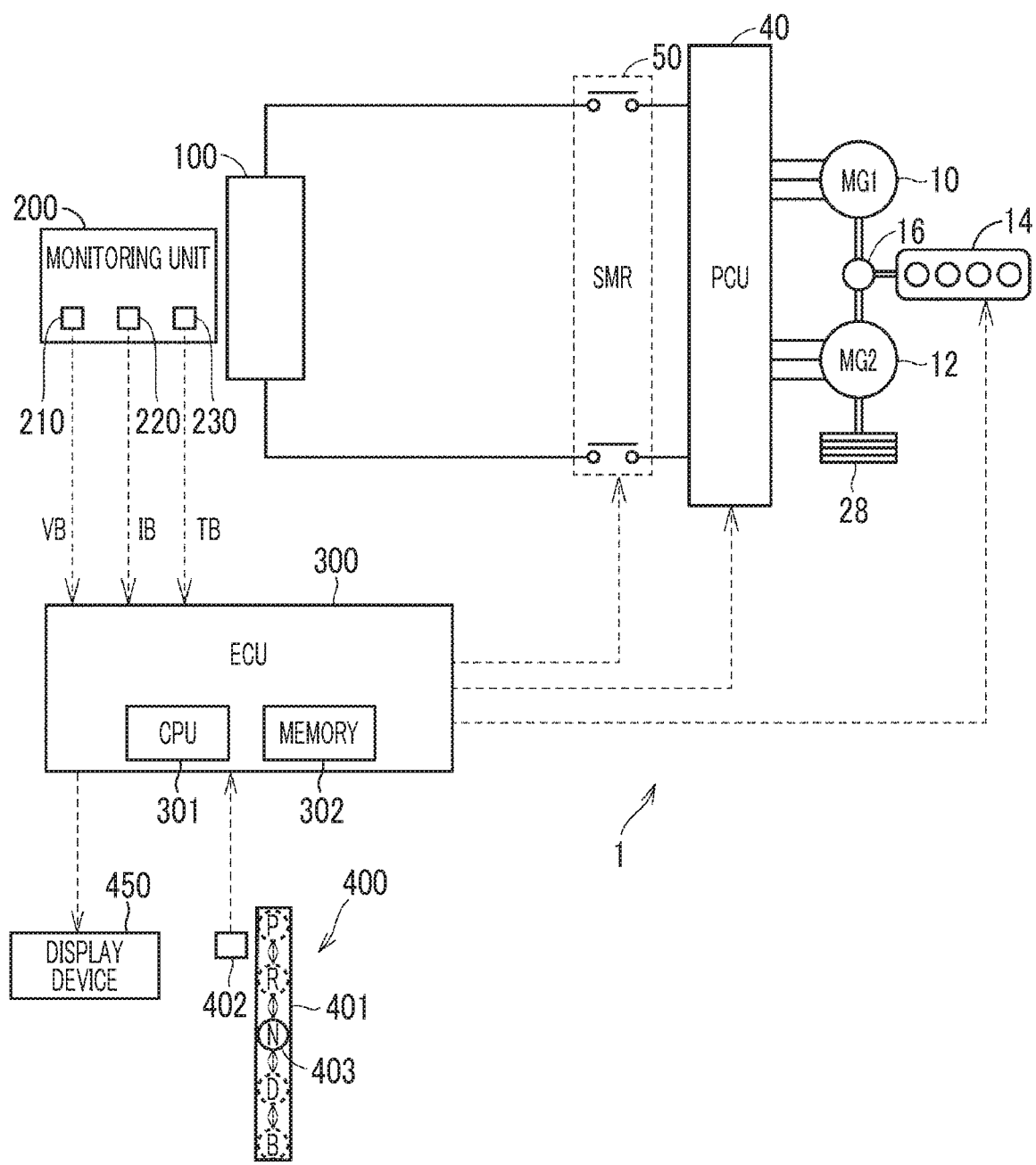
FIG. 1 is a diagram showing an example of the configuration of a hybrid vehicle.

Hereinafter, an embodiment of the present disclosure will be described in detail referring to the drawings. The same or similar portions in the drawings are represented by the same reference numerals, and description thereof will not be repeated.

In the following description, a case where an electrified vehicle according to the embodiment of the present disclosure is a hybrid vehicle will be described as an example. FIG. 1 is a diagram showing an example of the configuration of a hybrid vehicle. As shown in FIG. 1, a vehicle 1 includes a first motor generator (hereinafter, referred to as a first MG) 10, a second motor generator (hereinafter, referred to as a second MG) 12, an engine 14, a power split device 16, drive wheels 28, a power control unit (PCU) 40, a system main relay (SMR) 50, an electric power storage device 100, a monitoring unit 200, an electronic control unit (ECU) 300, a shift operating device 400, and a display device 450.

Each of the first MG 10 and the second MG 12 is a three-phase alternating-current rotating electric machine, and is, for example, a permanent magnet type synchronous motor including a rotor embedded with a permanent magnet. Both of the first MG 10 and the second MG 12 have a function as an electric motor (motor) and a function as a power generator (generator). The first MG 10 and the second MG 12 are connected to the electric power storage device 100 through the PCU 40.

The first MG 10 is driven by an inverter included in the PCU 40 and rotates an output shaft of the engine 14, for example, at the time of the start of the engine 14. The first MG 10 receives power of the engine 14 to generate electric power at the time of power generation. Electric power generated by the first MG 10 is stored in the electric power storage device 100 through the PCU 40.

The second MG 12 is driven by the inverter included in the PCU 40, for example, at the time of traveling of the vehicle 1. Power of the second MG 12 is transmitted to the drive wheels 28 through a power transmission gear (not shown), such as a differential gear or a reduction gear. The second MG 12 is driven by the drive wheels 28, for example, at the time of braking of the vehicle 1, and the second MG 12 operates as a power generator to perform regenerative braking. Electric power generated by the second MG 12 is stored in the electric power storage device 100 through the PCU 40.

The engine 14 is a known internal combustion engine, such as such as a gasoline engine or a diesel engine, which combusts fuel (gasoline or diesel oil) to output power, and is configured such that an operation state, such as a throttle valve opening degree (intake air amount), a fuel supply amount, or an ignition timing, can be electrically controlled by the ECU 300. The ECU 300 controls the fuel injection amount, the ignition timing, the intake air amount, and the like of the engine 14 such that the engine 14 operates with a target rotation speed and target torque set based on a state of the vehicle 1.

The power split device 16 splits power of the engine 14 into a path through which power is transmitted to the drive wheels 28 and a path through which power is transmitted to the first MG 10. The power split device 16 is constituted of, for example, a planetary gear mechanism.

The PCU 40 is an electric power conversion device that performs electric power conversion between the electric power storage device 100 and the first MG 10 or performs electric power conversion between the electric power storage device 100 and the second MG 12 in response to a control signal from the ECU 300. The PCU 40 includes an inverter that converts direct-current electric power from the electric power storage device 100 into alternating-current electric power to drive the first MG 10 or the second MG 12, a converter that adjusts a voltage level of direct-current electric power supplied from the electric power storage device 100 to the inverter, and the like (all are not shown).

The SMR 50 is electrically connected between the electric power storage device 100 and the PCU 40. Opening and closing of the SMR 50 is controlled in response to a control signal from the ECU 300.

The electric power storage device 100 is a direct-current power supply that is configured to be rechargeable, and is, for example, a secondary battery, such as a nickel-hydrogen battery or a lithium-ion battery including a solid or liquid electrolyte. A capacitor, such as an electric double layer capacitor, can be employed as the electric power storage device 100. The electric power storage device 100 supplies electric power for generating traveling drive power of the vehicle 1 to the PCU 40. The electric power storage device 100 is charged with electric power generated by a power generation operation using the first MG 10 and the engine 14, is charged with electric power generated by regenerative braking of the second MG 12, or is discharged by a drive operation of the first MG 10 or the second MG 12.

The monitoring unit 200 includes a voltage detection unit 210, a current detection unit 220, and a temperature detection unit 230. The voltage detection unit 210 detects a voltage VB between terminals of the electric power storage device 100. The current detection unit 220 detects a current IB input and output to and from the electric power storage device 100. The temperature detection unit 230 detects a temperature TB of the electric power storage device 100. Each detection unit outputs a detection result to the ECU 300.

The ECU 300 includes a central processing unit (CPU) 301 and a memory (including, for example, a read only memory (ROM), a random access memory (RAM), or the like) 302. The ECU 300 controls respective equipment (the engine 14, the PCU 40, the SMR 50, the display device 450, and the like) in the vehicle 1 based on information, such as a signal received from the monitoring unit 200 or a shift position sensor 402, a map and a program stored in the memory 302, such that the vehicle 1 is brought into a desired state. Various kinds of control that are executed by the ECU 300 are not limited to processing by software, and may be processed by dedicated hardware (electronic circuit).

The ECU 300 calculates a state of charge (SOC) indicating a remaining capacity of the electric power storage device 100 using a detection result of the monitoring unit 200, for example, during driving of the vehicle 1. As a calculation method of the SOC, for example, various known methods, such as a method by current value integration (coulomb count) and a method by estimation of an open circuit voltage (OCV), can be employed.

The shift operating device 400 includes a shift gate 401, a shift position sensor 402, and a shift lever 403.

The shift gate 401 is formed in such a shape that the shift lever 403 is movable in an up-down direction in FIG. 1. In the shift gate 401, positions corresponding to a plurality of shift positions are set. The shift positions include, for example, a parking position (hereinafter, referred to as a P position), a reverse position (hereinafter, referred to as an R position), a neutral position (hereinafter, referred to as an N position), a drive position (hereinafter, referred to as a D position), and a brake position (hereinafter, referred to as a B position).

The shift lever 403 is an operating member that is configured to be operable by a user. FIG. 1 shows that a position of the shift lever 403 is a position corresponding to the neutral position in the shift gate 401.

The shift position sensor 402 detects the position of the shift lever 403 in the shift gate 401. The shift position sensor 402 transmits a signal indicating the detected position of the shift lever 403 to the ECU 300.

In a case where the user displaces the shift lever 403 to a desired position in the shift gate 401, the shift position sensor 402 detects a shift position corresponding to the position of the shift lever 403 and transmits a signal indicating the detected shift position to the ECU 300.

The ECU 300 sets the D position as the shift position, for example, in a case where the position of the shift lever 403 is a position corresponding to the D position. In a case where the D position is set, the ECU 300 performs control of the vehicle 1 corresponding to the D position. For example, in a case where the D position is selected, the ECU 300 controls the respective equipment (for example, the PCU 40 and the engine 14) in the vehicle 1 such that charging of the electric power storage device 100 is permitted and a state in which generation of drive power is possible is brought.

The ECU 300 sets the N position as the shift position, for example, in a case where the position of the shift lever 403 is a position corresponding to the N position. In a case where the N position is set, the ECU 300 performs control of the vehicle 1 corresponding to the N position. For example, in a case where the N position is selected, the ECU 300 controls the respective equipment (for example, the PCU 40 and the engine 14) in the vehicle 1 such that a state in which generation of drive power in the vehicle 1 and charging of the electric power storage device 100 are suppressed is brought. For example, in a case where the N position is selected, the ECU 300 performs control such that the PCU 40 is brought into a non-actuation state.

The display device 450 is provided, for example, at a position visible to a driver who sits on a seat in a vehicle cabin of the vehicle 1. The display device 450 is constituted of, for example, a liquid crystal display, an organic electroluminescence (EL) display, or the like. The display device 450 displays predetermined information in response to a control signal from the ECU 300.

In the vehicle 1 configured as above, when the N position is selected as the shift position, generation of drive power is suppressed, and charging of the electric power storage device 100 is suppressed. As a result, as a selection time of the N position is extended, electric power is consumed by respective equipment, such as accessories, mounted in the vehicle 1, and the SOC of the electric power storage device 100 is decreasing. For this reason, there is a possibility that a travelable distance of the vehicle 1 through electrified traveling is shortened.

For this reason, for example, a case where a time for which the N position is selected is measured, and information for prompting change to another shift position other than the N position when the measured time exceeds a predetermined time is notified is considered. In this case, a case where the selection time measured when the shift position is switched to another shift position is reset to an initial value (for example, zero) is considered.

However, when the N position is selected, and when another shift position is temporarily selected and a user performs an operation to return to the N position again, the travelable distance through electrified traveling may not be restrained from being shortened.

This is because, in a case where the above-described operation is repeated, the selection time of the N position is reset to the initial value every time, and as a result, the SOC of the electric power storage device is continued to decrease while the user is not prompted to make change to another shift position.

Accordingly, in the embodiment, the ECU 300 gives notification of information for prompting change of the shift position using the display device 450 when a value correlated to a decrease amount of the SOC of the electric power storage device 100 during the selection of the N position exceeds a value determined in advance, resets the value correlated to the decrease amount to an initial value in a case where an elapsed time during the selection of another shift position exceeds a time determined in advance when the N position is selected again after the shift position is switched from the N position to another shift position, and maintains the value correlated to the decrease amount before the shift position is switched to another shift position without resetting the value in a case where the elapsed time does not exceed the time determined in advance. In the embodiment, a case where the time for which the N position is selected as the value correlated to the decrease amount will be described as an example.

With this configuration, when another shift position is selected from the N position, and the N position is selected again when the elapsed time during the selection of another shift position does not exceed the time determined in advance, the elapsed time is maintained without being reset. For this reason, since information for prompting change to another shift position when the elapsed time exceeds the value determined in advance is notified, when the selection time of the N position is extended even though there is a period during which another shift position is temporarily selected, it is possible to notify the user of change to another shift position.

Figure 2:
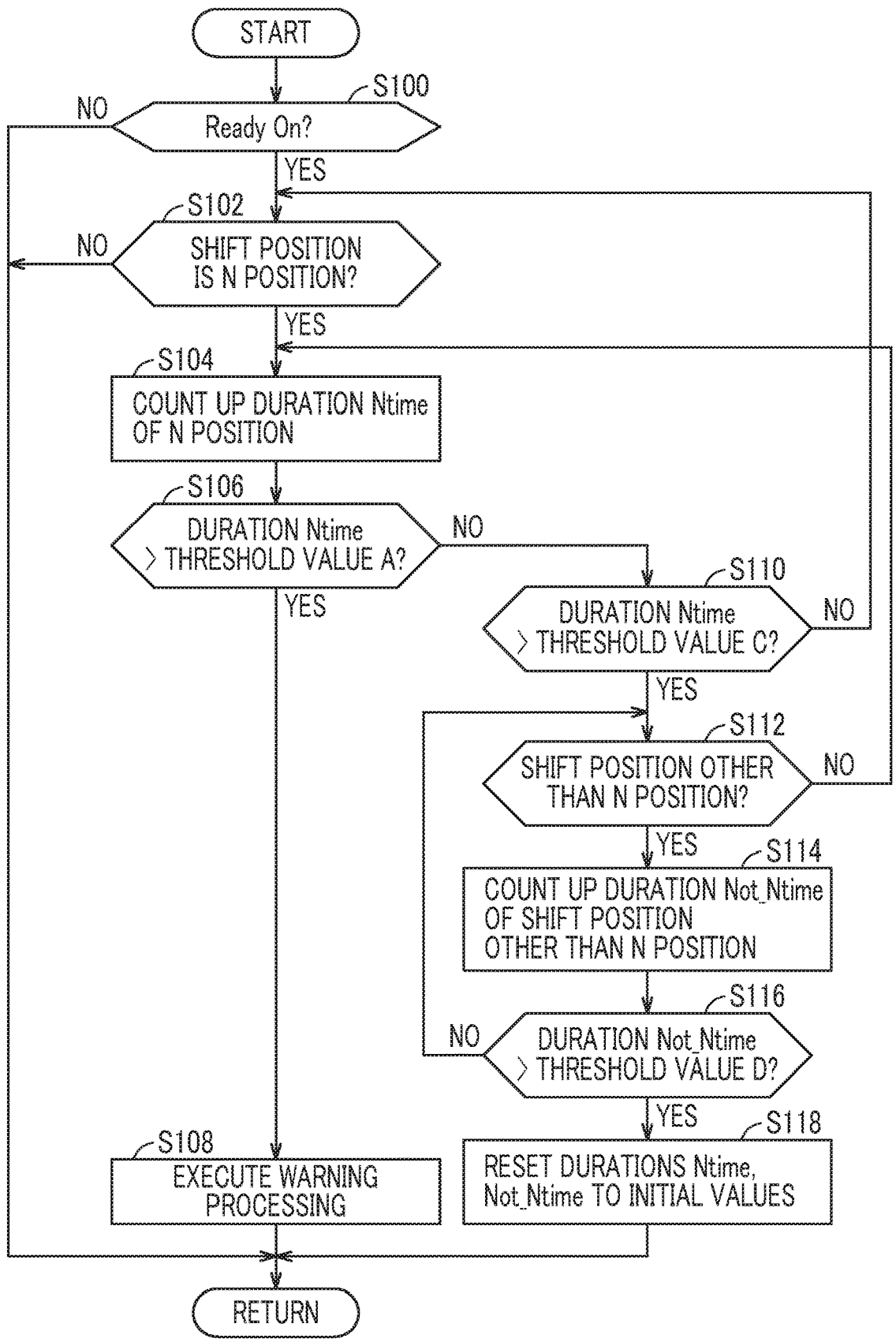
FIG. 2 is a flowchart showing an example of processing that is executed by an ECU.

Hereinafter, an example of control processing that is executed by the ECU 300 will be described referring to FIG. 2. FIG. 2 is a flowchart showing an example of processing that is executed by the ECU 300. A series of processing shown in the flowchart is repeatedly executed by the ECU 300 in each predetermined control cycle.

In Step (hereinafter, Step is referred to as S) 100, the ECU 300 determines whether or not the vehicle 1 is in a Ready-On state (travelable state). The ECU 300 may determine that the vehicle 1 is in the Ready-On state, for example, when the SMR 50 is in a closed state. Alternatively, the ECU 300 may bring a predetermined flag into an on state, for example, when a predetermined operation to bring the vehicle into the Ready-On state, and may determine whether or not the vehicle 1 is in the Ready-On state based on a state of the flag. The predetermined operation includes an operation of the user to turn on a power switch (not shown) in a state depressing a brake pedal (not shown), for example, when a system of the vehicle 1 is in a stop state. When determination is made that the vehicle 1 is in the Ready-On state (in S100, YES), the process progresses to S102.

In S102, the ECU 300 determines whether or not the shift position is the N position. The ECU 300 determines that the shift position is the N position when the shift position set based on the detection result of the shift position sensor 402 is the N position. When determination is made that the shift position is the N position (in S102, YES), the process progresses to S104.

In S104, the ECU 300 counts up a duration Ntime of the N position. An initial value of the duration Ntime is set to, for example, zero. The ECU 300 adds a value Δt determined in advance to a value (previous value) in previous calculation of the duration Ntime of the N position to count up the duration Ntime, thereby calculating a value (present value) in present calculation of the duration Ntime. The value Δt determined in advance is, for example, an elapsed time from a previous calculation point of time, and is a value corresponding to the predetermined control cycle described above.

In S106, the ECU 300 determines whether or not the duration Ntime is greater than a threshold value A. The threshold value A is, for example, a value determined in advance. The threshold value A is set based on a time at which the magnitude of the decrease amount of the SOC of the electric power storage device 100 becomes a predetermined value (for example, about 10%) when power consumption of electrical equipment mounted in the vehicle 1 during the selection of the N position is calculated at maximum, for example, when the shift position is continued as the N position. When determination is made that the duration Ntime is greater than the threshold value A (in S106, YES), the process progresses to S108.

In S108, the ECU 300 executes warning processing. The ECU 300 makes the display device 450 display, for example, information for prompting change to another shift position other than the N position. The information is displayed on the display device 450, thereby prompting the user to make change to another shift position. The ECU 300 may prompt the user to make change to the D position for example, when the vehicle 1 is traveling forward or may prompt the user to make change to the P position when the vehicle 1 is parked. When determination is made that the duration Ntime is equal to or less than the threshold value A (in S106, NO), the process progresses to S110.

In S110, the ECU 300 determines whether or not the duration Ntime is greater than a threshold value C. The threshold value C is a value smaller than the threshold value A, and is a value determined in advance. The threshold value C is set to, for example, a value for determining whether or not the N position is continuously selected to such an extent that the SOC of the electric power storage device 100 decreases by a predetermined amount, and is adapted by an experiment or the like. When determination is made that the duration Ntime is greater than the threshold value C (in S110, YES), the process progresses to S112.

In S112, the ECU 300 determines whether or not the shift position is another shift position other than the N position. Similarly to the processing of S102, the ECU 300 determines that the shift position is another shift position other than the N position when the shift position set based on the detection result of the shift position sensor 402 is, for example, any one of the P position, the R position, the D position, and the B position. When determination is made that the shift position is another shift position other than the N position (in S112, YES), the process progresses to S114.

In S114, the ECU 300 counts up a duration Not_Ntime of another shift position other than the N position. In the embodiment, the duration Not_Ntime of another shift position other than the N position is, for example, a sum of a duration of the P position, a duration of the R position, a duration of the D position, and a duration of the B position. An initial value of the duration Not_Ntime is set to, for example, zero. The ECU 300 adds a value Δt determined in advance to a value indicating the duration Not_Ntime to count up the duration Not_Ntime. The value Δt determined in advance is as described above, and thus, detailed description thereof will not be repeated.

In S116, the ECU 300 determines whether or not the duration Not_Ntime is greater than a threshold value D. The threshold value D is a time for which determination can be made that charging of the electric power storage device 100 is performed to such an extent that the SOC of the electric power storage device 100 does not decrease, for example, when another shift position other than the N position is selected. The threshold value D is a value determined in advance, and is adapted by an experiment or the like. In a case where determination is made that the duration Not_Ntime is greater than the threshold value D (in S116, YES), the process progresses to S118.

In S118, the ECU 300 resets each of the duration Ntime and the duration Not_Ntime to the initial value (zero).

When determination is made that the Ready-On state is not brought (in S100, NO) or after determination is made that the Ready-On state is brought (in S100, YES), when determination is made that the shift position is not the N position (in S102, NO), the process ends.

When determination is made that the duration Ntime is equal to or less than the threshold value C (in S110, NO), the process returns to S102. When determination is made that the shift position is not another shift position other than the N position (in S112, NO), the process returns to S104. When determination is made that the duration Not_Ntime is equal to or less than the threshold value D (in S116, NO), the process returns to S112.

Figure 3:
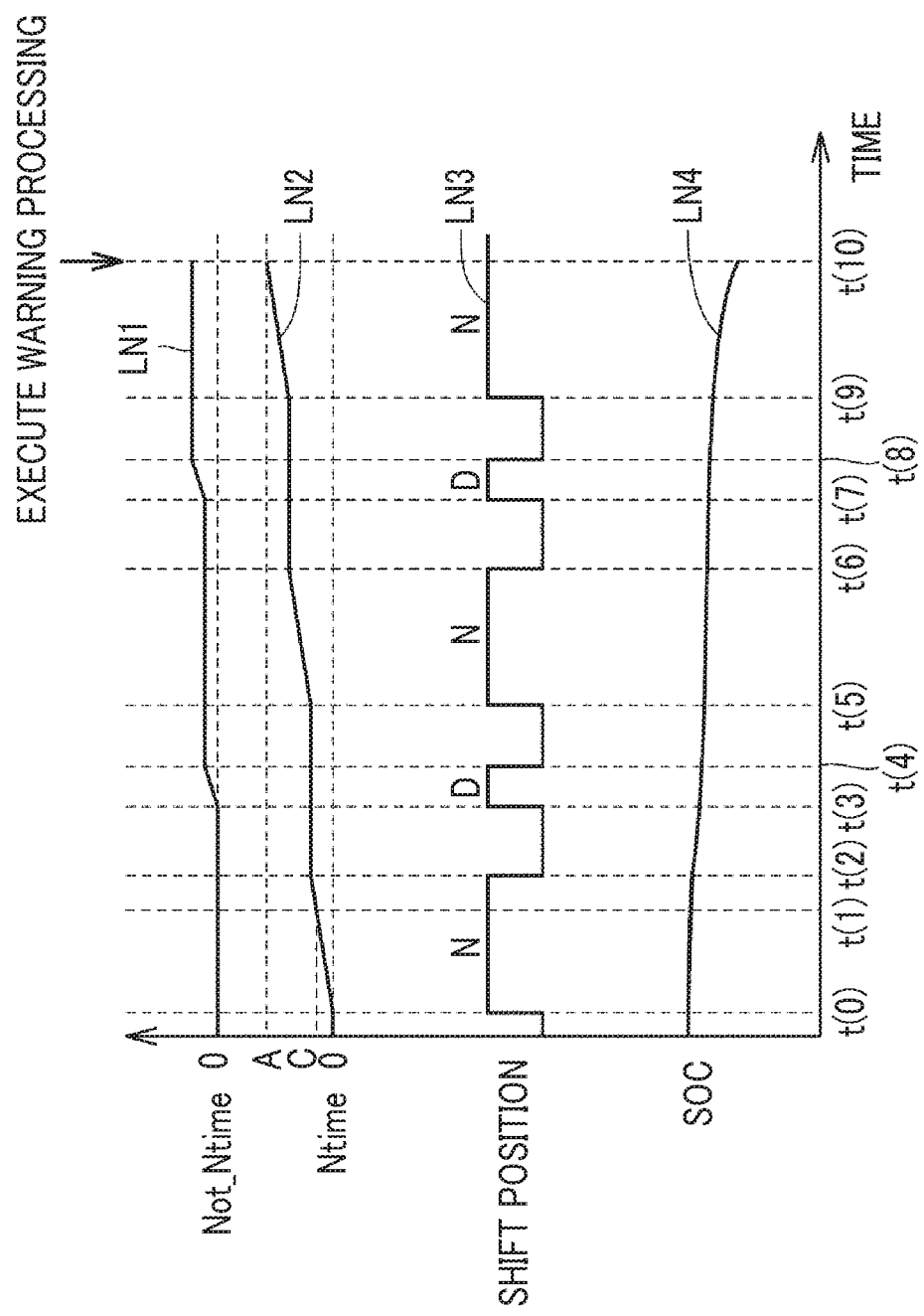
FIG. 3 is a timing chart illustrating an example of the operation of the ECU.

An example of the operation of the ECU 300 mounted in the vehicle 1 as an electrified vehicle according to the embodiment based on the structure and the flowchart described above will be described referring to FIG. 3. FIG. 3 is a timing chart illustrating an example of the operation of the ECU 300.

LN1 of FIG. 3 shows an example of change in duration Not_Ntime. LN2 of FIG. 3 shows an example of change in duration Ntime. LN3 of FIG. 3 shows an example of change in shift position. LN4 of FIG. 3 shows an example of change in SOC of the electric power storage device 100. A case where the vehicle 1 is in the Ready-On state is assumed.

At time t(0), as shown in LN3 of FIG. 3, in a case where the shift lever 403 is moved to the position corresponding to the N position in the shift gate 401 by the user, the ECU 300 sets the N position as the shift position based on the detection result of the shift position sensor 402 to perform the control of the vehicle 1 corresponding to the N position.

In this case, the ECU 300 performs control, for example, such that the PCU 40 is brought into a non-actuation state. For this reason, charging of the electric power storage device 100 and generation of drive power are suppressed. In this case, electric power is consumed in the electrical equipment mounted in the vehicle 1, whereby the SOC of the electric power storage device 100 is decreasing as shown in LN4 of FIG. 3.

In a case where the vehicle 1 is in the Ready-On state (in S100, YES), and the shift position is the N position (in S102, YES), as shown in LN2 of FIG. 3, the duration Ntime is counted up (S104). When the duration Ntime is equal to or less than the threshold value A (in S106, NO), and is equal to or less than the threshold value C (in S110, NO), while the shift position is the N position (in S102, YES), the count-up of the duration Ntime is continued (S104).

At time t(1), in a case where the duration Ntime becomes greater than the threshold value C (in S110, YES), determination is made whether or not the shift position is a shift position other than the N position (S112). While the shift position is the N position (in S112, NO), the count-up of the duration Ntime is continued (S104).

At time t(2), in a case where the user moves the shift lever 403 from the position corresponding to the N position in the shift gate 401, as shown in LN3 of FIG. 3, the selection of the N position is released.

At time t(3), in a case where the user moves the shift lever 403 to a position corresponding to the D position in the shift gate 401, the ECU 300 sets the D position as the shift position based on the detection result of the shift position sensor 402 to perform the control of the vehicle 1 corresponding to the D position. The ECU 300 performs control, for example, such that the PCU 40 is brought into an actuation state. For this reason, charging of the electric power storage device 100 is permitted, and a state in which generation of drive power is possible is brought.

In a case where the shift position becomes the D position (in S112, YES), as shown in LN1 of FIG. 3, the duration Not_Ntime is counted up (S114). When the duration Not_Ntime is equal to or less than the threshold value D (in S116, NO), while the shift position is the D position (in S112, YES), the count-up of the duration Not_Ntime is continued (S114).

At time t(4), in a case where the user moves the shift lever 403 from the position corresponding to the D position in the shift gate 401, as shown in LN3 of FIG. 3, the selection of the D position is released.

At time t(5), in a case where the user moves the shift lever 403 to the position corresponding to the N position in the shift gate 401, the ECU 300 sets the N position as the shift position based on the detection result of the shift position sensor 402 to perform the control of the vehicle 1 corresponding to the N position.

In a case where the shift position becomes the N position (in S112, NO), as shown in LN2 of FIG. 3, the duration Ntime of the N position is counted up (S104). In this case, since the duration Ntime is maintained without being reset to the initial value (zero), the duration Ntime is counted up from a value (the value at time t(2)) immediately before the shift lever 403 is moved toward the D position.

At time t(6), in a case where the user moves the shift lever 403 from the position corresponding to the N position in the shift gate 401, as shown in LN3 of FIG. 3, the selection of the N position is released.

At time t(7), in a case where the user moves the shift lever 403 to the position corresponding to the D position in the shift gate 401, the ECU 300 sets the D position as the shift position based on the detection result of the shift position sensor 402 to perform the control of the vehicle 1 corresponding to the D position.

In a case where the shift position becomes the D position, as shown in LN1 of FIG. 3, the duration Not_Ntime is counted up (S114). In this case, since the duration Not_Ntime is maintained without being reset to the initial value (zero), the duration Not_Ntime is counted up from a value (the value at time t(4)) immediately before the shift lever 403 is moved toward the N position.

At time t(8), in a case where the user moves the shift lever 403 from the position corresponding to the D position in the shift gate 401, as shown in LN3 of FIG. 3, the selection of the D position is released.

At time t(9), in a case where the user moves the shift lever 403 to the position corresponding to the N position in the shift gate 401, the ECU 300 sets the N position as the shift position based on the detection result of the shift position sensor 402 to perform the control of the vehicle 1 corresponding to the N position.

In a case where the shift position becomes the N position (in S112, NO), as shown in LN2 of FIG. 3, the duration Ntime of the N position is counted up (S104). In this case, since the duration Ntime is maintained without being reset to the initial value (zero), the duration Ntime is counted up from a value (the value at time t(6)) immediately before the shift lever is moved toward the D position.

At time t(10), as shown in LN2 of FIG. 3, in a case where the duration Ntime is greater than the threshold value A (in S106, YES), the warning processing is executed (S108).

For this reason, information for prompting change of the shift position to another shift position other than the N position is displayed on the display device 450.

Figure 4:
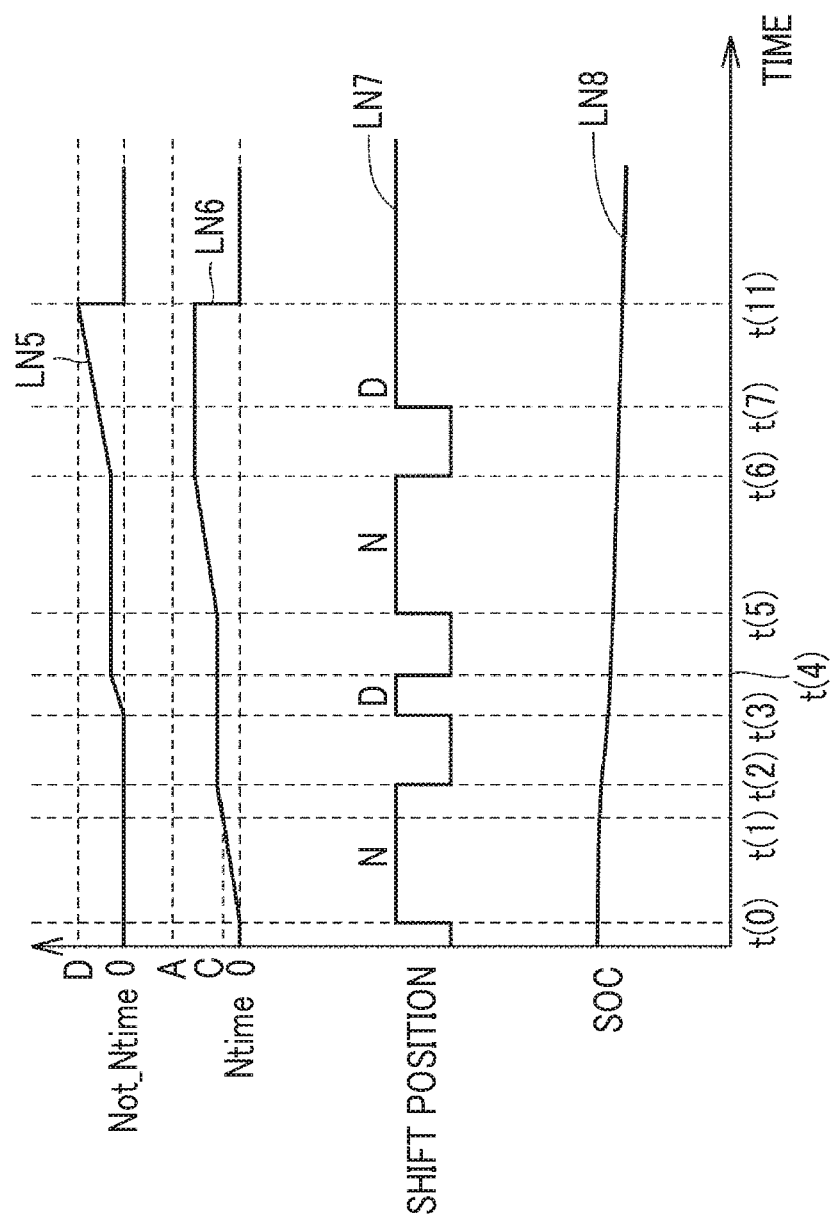
FIG. 4 is a timing chart illustrating another example of the operation of the ECU.

Next, another example of the operation of the ECU 300 will be described referring to FIG. 4. FIG. 4 is a timing chart illustrating another example of the operation of the ECU.

LN5 of FIG. 4 shows an example of change in duration Not_Ntime. LN6 of FIG. 4 shows an example of change in duration Ntime. LN7 of FIG. 4 shows an example of change in shift position. LN8 of FIG. 4 shows an example of change in SOC of the electric power storage device 100. A case where the vehicle 1 is in the Ready-On state is assumed.

The changes of LN5 to LN8 until time t(7) of FIG. 4 are the same as the changes of LN1 to LN4 until time t(7) of FIG. 3. For this reason, detailed description thereof will not be repeated excluding the following case.

At time t(7), as shown in LN7 of FIG. 4, in a case where the user moves the shift lever 403 to the position corresponding to the N position in the shift gate 401, the ECU 300 sets the D position as the shift position based on the detection result of the shift position sensor 402 to perform the control of the vehicle 1 corresponding to the D position.

In a case where the shift position becomes the D position, as shown in LN5 of FIG. 4, the duration Not_Ntime is counted up (S114). In this case, since the duration Not_Ntime is maintained without being reset to the initial value (zero), the duration Not_Ntime is counted up from a value (the value at time t(4)) immediately before the shift lever is moved toward the N position (S116).

As shown in LN7 of FIG. 4, in a case where a state in which the D position is selected is continued after time t(7) (in S112, YES), the count-up of the duration Not_Ntime is continued (S116).

At time (11), in a case where the duration Not_Ntime becomes greater than the threshold value D (in S116, YES), as shown in LN5 and LN6 of FIG. 4, the durations Ntime, Not_Ntime are reset to the initial values (zero). In a case where a state in which the D position is selected as the shift position is continued, charging of the electric power storage device 100 is permitted. Thus, as shown in LN8 of FIG. 4, a decrease in SOC of the electric power storage device 100 is suppressed after time t(11) compared to a case where the N position is continuously selected.

As described above, with the electrified vehicle according to the embodiment, for example, when another shift position, such as the D position, is selected from the N position, and the N position is selected again when the duration Not_Ntime for which another shift position is selected does not exceed the threshold value D, the duration Ntime is maintained without being reset. For this reason, since information for prompting change to another shift position when the duration Ntime exceeds the threshold value A is notified, when the selection time of the N position is extended even though there is a period during which another shift position is temporarily selected, it is possible to notify the user of change to another shift position. Accordingly, it is possible to provide an electrified vehicle and a control method for an electrified vehicle that enable notification of change of the shift position to the user at an appropriate timing according to the selection time of the neutral position.

The ECU 300 resets the duration Not_Ntime to the initial value in addition to the duration Ntime in a case where the duration Not_Ntime of another shift position exceeds the threshold value D. For this reason, when another shift position is temporarily selected thereafter, it is possible to restrain the duration Ntime from being reset to the initial value.

The ECU 300 counts up the duration Not_Ntime when the duration Ntime is greater than the threshold value C, and another shift position is selected. With this configuration, it is possible to restrain the duration Not_Ntime from being counted up when a time for which the N position is selected is short.

Hereinafter, modification examples will be described.

In the above-described embodiment, although the configuration of a hybrid vehicle as the vehicle 1 has been described as an example, the vehicle 1 may be an electrified vehicle, and is not limited to a hybrid vehicle. The vehicle 1 may be, for example, an electric vehicle in which a single motor generator or a plurality of motor generators is mounted as a drive source.

In the above-described embodiment, although a configuration in which the shift operating device 400 includes the shift gate 401, the shift position sensor 402, and the shift lever 403, and the shift position corresponding to the position of the shift lever 403 in the shift gate 401 is selected has been described as an example, the shift operating device is not particularly limited to a gate type shift operating device described above, and may be, for example, a momentary type shift operating device.

Figure 5:
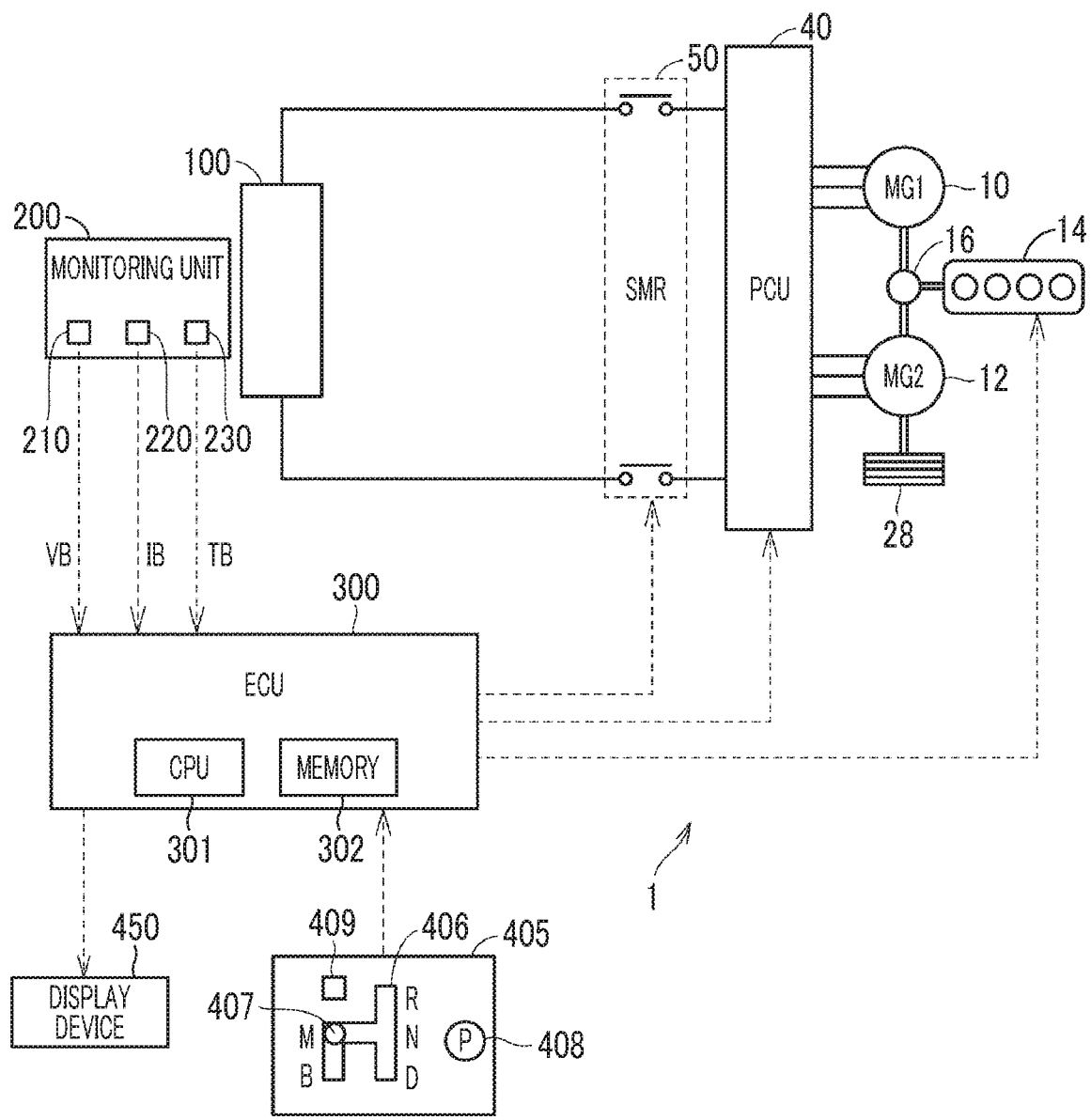
FIG. 5 is a diagram showing another configuration example of a hybrid vehicle.

FIG. 5 is a diagram showing another configuration example of a hybrid vehicle. The configuration of a vehicle 1 of FIG. 5 is different from the configuration of the vehicle 1 of FIG. 1 in that a shift operating device 405 is provided instead of the shift operating device 400. Other configurations are the same as the configurations of the vehicle 1 of FIG. 1, and are represented by the same reference numerals. For this reason, detailed description thereof will not be repeated.

The shift operating device 405 includes a shift gate 406, a shift lever 407, a parking switch (hereinafter, referred to as a P switch) 408, and a shift position sensor 409.

The shift lever 407 is a momentary type lever, is maintained at an M position as shown in FIG. 5 during a non-operation of the user, and is moved along the shift gate 406 during an operation of the user. In the shift gate 406, in addition to the M position, a D position, an R position, an N position, a B position, and the like are set at positions determined in advance. The shift position sensor 409 detects a position of the shift lever 407. In a case where the shift lever 407 is operated, the shift position sensor 409 transmits a signal indicating the position of the shift lever 407 in the shift gate 406 to the ECU 300. The ECU 300 sets a shift position using a detection result of the shift position sensor 409.

The ECU 300 sets the D position as the shift position, for example, when the shift lever 407 is moved to a position (a lower right position from a position corresponding to the M position in FIG. 5) corresponding to the D position in the shift gate 406, and the shift lever 407 is maintained at the position corresponding to the D position until a time determined in advance elapses.

Similarly, the ECU 300 sets the N position as the shift position, for example, when the shift lever 407 is moved to a position (a position on a right side from the position corresponding to the M position in FIG. 5) corresponding to the N position in the shift gate 406, and the shift lever 407 is maintained at a position corresponding to the N position until a time determined in advance elapses.

The P switch 408 is a switch that is provided for the user to select the P position. In a case where the P switch 408 is operated, a signal indicating that the P position is selected is transmitted to the ECU 300. The ECU 300 sets the P position as the shift position in a case where the signal indicating that the P position is selected is received from the shift operating device 405. The ECU 300 performs control of the vehicle 1 corresponding to the P position in a case where the P position is set. The ECU 300 performs, for example, control for operating a packing lock mechanism.

In the above-described embodiment, although a case where the time for which the N position is selected is the value correlated to the decrease amount of the SOC has been described as an example, for example, the value correlated to the decrease amount of the SOC may be the magnitude of the decrease amount of the SOC. That is, the ECU 300 may display information for prompting change of the shift position using the display device 450 when the magnitude of the decrease amount of the SOC of the electric power storage device 100 during the selection of the N position exceeds a threshold value.

Figure 6:
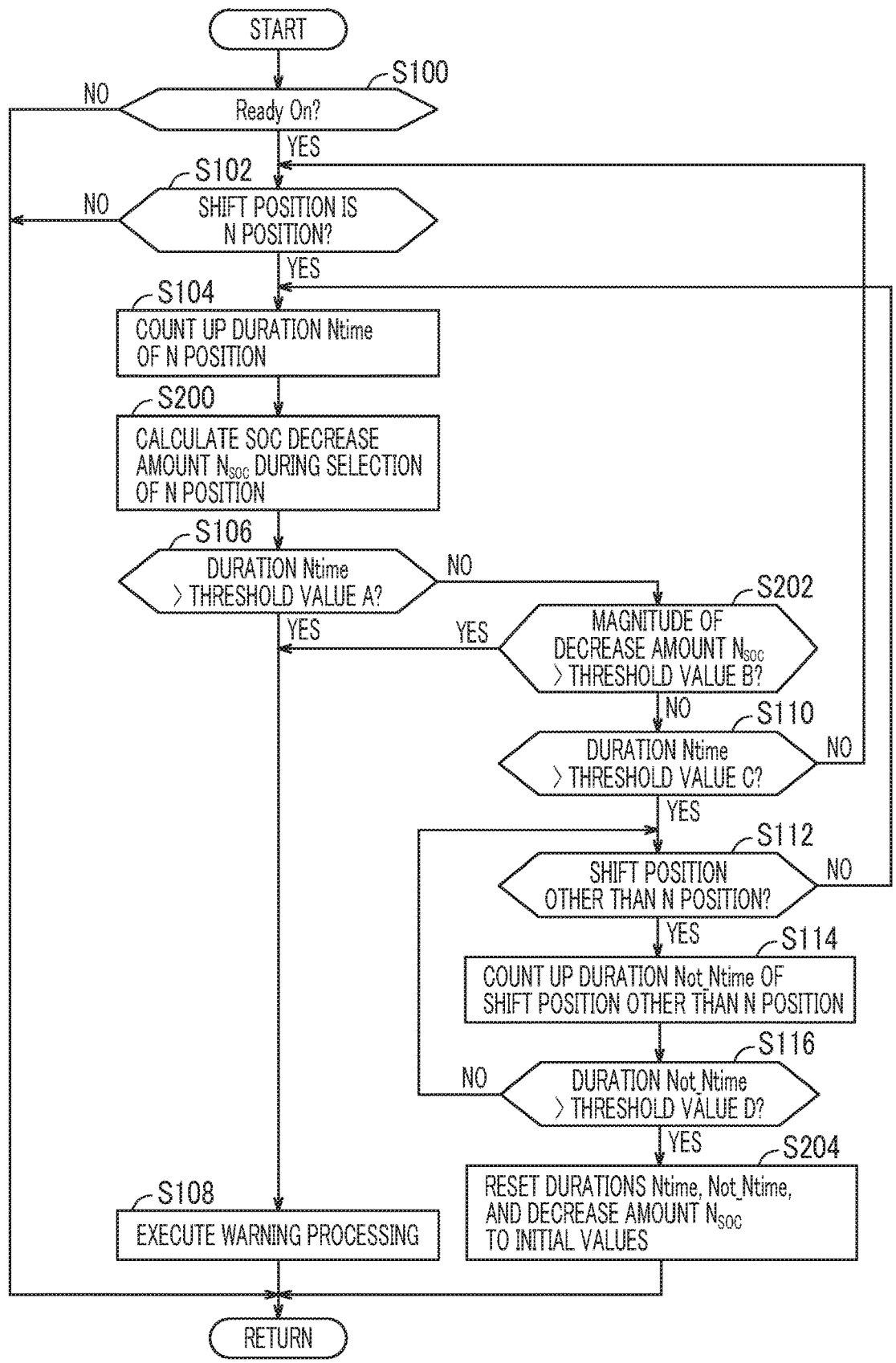
FIG. 6 is a flowchart showing an example of processing that is executed by an ECU in a modification example.

FIG. 6 is a flowchart showing an example of processing that is executed by the ECU 300 in the modification example. The flowchart shown in FIG. 6 is different from the flowchart shown in FIG. 2 in that S200 is executed after the processing of S104, processing of S202 is executed in a case where the determination result in the processing of S106 is NO, and processing of S204 is executed instead of the processing of S118, excluding the following case. Other kinds of processing are the same as the processing of the flowchart shown in FIG. 2, and the same kinds of processing are represented by the same step numbers. For this reason, detailed description thereof will not be repeated.

In S104, after the duration Ntime of the N position is counted up, the process progresses to S200.

In S200, the ECU 300 calculates an SOC decrease amount Nsoc of the electric power storage device 100 during the selection of the N position.

The ECU 300 may calculate the SOC decrease amount Nsoc of the electric power storage device 100, for example, using the SOC of the electric power storage device 100 at a point of time when the shift position is switched to the N position and the SOC of the electric power storage device 100 at a present point of time. A calculation method of the SOC of the electric power storage device 100 is as described above, and thus, detailed description thereof will not be repeated.

Alternatively, the ECU 300 integrates a charging and discharging current, for example, from the point of time when the shift position is switched to the N position, and may calculate the SOC decrease amount Nsoc of the electric power storage device 100 using the integrated value. After the processing of S200, the process progresses to S106. When determination is made that the duration Ntime of the N position is equal to or less than the threshold value A (in S106, NO), the process progresses to S202.

In S202, the ECU 300 determines whether or not the magnitude of the decrease amount Nsoc of the SOC of the electric power storage device 100 is greater than a threshold value B. The threshold value B is set, for example, from a viewpoint of whether or not the travelable distance of the vehicle 1 is affected. The threshold value B is, for example, a value determined in advance, and is adapted by an experiment or the like. When determination is made that the magnitude of the decrease amount Nsoc of the SOC of the electric power storage device 100 is greater than the threshold value B (in S202, YES), the process progresses to S108. When the magnitude of the decrease amount Nsoc of the SOC of the electric power storage device 100 is equal to or less than the threshold value B (in S202, NO), the process progresses to S110. In a case where determination is made that the duration Not_Ntime is greater than the threshold value D (in S116, YES), the process progresses to S204.

In S204, the ECU 300 resets the durations Ntime, Not_Ntime and the decrease amount Nsoc to the initial values (zero).

With this configuration, in a case where the duration Ntime becomes greater than the threshold value A or the decrease amount Nsoc becomes greater than the threshold value B, information for prompting change of the shift position is displayed on the display device 450. Thus, it is possible to suppress a further decrease in SOC of the electric power storage device 100 with continuous selection of the N position.

In a case where the duration Not_Ntime is greater than the threshold value D, the decrease amount Nsoc is reset to the initial value (zero) in addition to the durations Ntime, Not_Ntime. Thus, it is possible to suppress notification of information for prompting change of the shift position when the SOC of the electric power storage device 100 decreases for a factor other than the magnitude of the decrease amount with the continuous selection of the N position.

It should be noted that the above-described modification examples may be entirely or partially combined as appropriate for implementation.

The embodiment disclosed herein is to be considered merely illustrative and not restrictive in all respects. The scope of the disclosure present disclosure is defined by the terms of the claims, rather than the above description of the embodiment, and is intended to include any modifications within the scope and meaning equivalent to the terms of the claims.

What is claimed is:
1. An electrified vehicle comprising:
an electric motor for drive configured to generate drive power in a vehicle;
an electric power storage device configured to transmit and receive electric power to and from the electric motor for drive;

a notification device configured to give notification of predetermined information;

an operating device configured to issue a selection instruction to any one of a plurality of shift positions including a neutral position where the generation of the drive power is suppressed; and a control device configured to control the vehicle according to a shift position selected in response to the selection instruction, wherein the control device is configured to give notification of information for prompting change of the shift position using the notification device when a value correlated to a decrease amount of a remaining capacity of the electric power storage device during the selection of the neutral position exceeds a value determined in advance, and when the neutral position is selected again after the shift position is switched from the neutral position to another shift position, reset the value correlated to the decrease amount to an initial value in a case where an elapsed time during the selection of the other shift position exceeds a time determined in advance, and maintain the value correlated to the decrease amount before the shift position is switched to the other shift position without resetting the value in a case where the elapsed time does not exceed the time determined in advance.

2. The electrified vehicle according to claim 1, wherein the value correlated to the decrease amount includes a time for which the neutral position is selected.

3. The electrified vehicle according to claim 1, wherein the value correlated to the decrease amount includes a magnitude of the decrease amount.

4. The electrified vehicle according to claim 1, wherein the control device is configured to, when the neutral position is selected again from the other shift position, reset the elapsed time to an initial value in addition the value correlated to the decrease amount in a case where the elapsed time exceeds the time determined in advance.

5. The electrified vehicle according to claim 1, wherein the control device is configured to suppress charging of the electric power storage device when the neutral position is selected.

6. A control method for an electrified vehicle including an electric motor for drive configured to generate drive power in a vehicle, an electric power storage device configured to transmit and receive electric power to and from the electric motor for drive, a notification device configured to give notification of predetermined information, and an operating device configured to issue a selection instruction to any one of a plurality of shift positions including a neutral position where the generation of the drive power is suppressed, the control method comprising:

controlling the vehicle according to a shift position selected in response to the selection instruction;

giving notification of information for prompting change of the shift position using the notification device when a value correlated to a decrease amount of a remaining capacity of the electric power storage device during the selection of the neutral position exceeds a value determined in advance;

resetting a value correlated to the decrease amount to an initial value in a case where an elapsed time for which another shift position is selected exceeds a time determined in advance when the neutral position is selected again after the shift position is switched from the neutral position to the other shift position; and maintaining the value correlated to the decrease amount before the shift position is switched to the other shift position without resetting the value in a case where the elapsed time does not exceed the time determined in advance.

* * * * *